United States Patent
Ratiner et al.

(10) Patent No.: US 11,005,852 B2
(45) Date of Patent: May 11, 2021

(54) SYSTEM AND METHOD FOR SECURING ELECTRONIC DEVICES

(71) Applicants: Michael Ratiner, Rishon LeZion (IL); Dan Eliav, Zichron Yaakov (IL)

(72) Inventors: Michael Ratiner, Rishon LeZion (IL); Dan Eliav, Zichron Yaakov (IL)

(*) Notice: Subject to any disclaimer, the term of this patent is extended or adjusted under 35 U.S.C. 154(b) by 85 days.

(21) Appl. No.: 16/344,855

(22) PCT Filed: Oct. 25, 2017

(86) PCT No.: PCT/IL2017/051166
§ 371 (c)(1),
(2) Date: Apr. 25, 2019

(87) PCT Pub. No.: WO2018/078622
PCT Pub. Date: May 3, 2018

(65) Prior Publication Data
US 2019/0334922 A1  Oct. 31, 2019

Related U.S. Application Data

(60) Provisional application No. 62/412,446, filed on Oct. 25, 2016.

(51) Int. Cl.
*H04L 29/06* (2006.01)
*G06F 9/50* (2006.01)
*G06F 21/60* (2013.01)

(52) U.S. Cl.
CPC .............. *H04L 63/105* (2013.01); *G06F 9/50* (2013.01); *G06F 21/602* (2013.01); *H04L 63/08* (2013.01); *H04L 63/102* (2013.01); *H04L 63/104* (2013.01)

(58) Field of Classification Search
CPC ..... H04L 63/105; H04L 63/08; H04L 63/102; H04L 63/104; G06F 9/50; G06F 21/602
See application file for complete search history.

(56) References Cited

U.S. PATENT DOCUMENTS 9,781,122 B1 * 10/2017 Wilson .................... H04L 63/08
10,505,982 B2 * 12/2019 Motukuru ............... H04L 63/08
(Continued)

FOREIGN PATENT DOCUMENTS

| EP | 1898307 A1 | 3/2008 |
| IN | 2014DE03912 A | 1/2015 |

OTHER PUBLICATIONS

Porquet, J. et al., "Multi-compartment: a new architecture for secure co-hosting on SoC." In System-on-Chip, 2009. SOC 2009. International Symposium on, pp. 124-127. IEEE, 2009 (Oct. 5, 2009).

*Primary Examiner* — J. Brant Murphy
*Assistant Examiner* — Stephen T Gundry
(74) *Attorney, Agent, or Firm* — Browdy and Neimark, P.L.L.C.

(57) ABSTRACT

System for authenticating a user's identity and facilitating execution of embedded software and access to specific hardware modules according to an authorization level, comprising: •a communication interface, enabling a user to interface the system; •an authentication module, configured to authenticate user's identity; •an authorization module, configured to determine authorization level and access privileges associated with user; •at least one Software Execution Environment (SEE); and •at least one hardware switch, controllable by said authorization module and configured to physically enable or disable data transfer over a data path between the user and SEE, whereupon successful authentication of the user will cause the authorization module to allocate hardware resources at the SEE for the user, and configure the hardware switch to enable data transfer between the user and the SEE, and enable the user to execute embedded code on the SEE according to the authorization level.

23 Claims, 8 Drawing Sheets

(56) References Cited

U.S. PATENT DOCUMENTS

| | | | |
|---|---|---|---|
| 10,516,672 B2* | 12/2019 | Gupta | G06F 21/41 |
| 2004/0177342 A1 | 9/2004 | Worley, Jr. | |
| 2008/0235771 A1 | 9/2008 | Corley et al. | |
| 2008/0271122 A1 | 10/2008 | Nolan et al. | |
| 2011/0314538 A1* | 12/2011 | Huang | G06F 21/74 |
| | | | 726/19 |
| 2013/0086385 A1 | 4/2013 | Poeluev | |
| 2013/0111551 A1 | 5/2013 | Dellacona et al. | |
| 2013/0303146 A1* | 11/2013 | Van Voorhees | H04W 12/0806 |
| | | | 455/418 |
| 2014/0195927 A1* | 7/2014 | DeWeese | H04L 63/083 |
| | | | 715/750 |
| 2014/0196130 A1* | 7/2014 | Brooker | H04L 63/08 |
| | | | 726/6 |
| 2015/0082372 A1* | 3/2015 | Kottahachchi | G06F 21/604 |
| | | | 726/1 |
| 2016/0277216 A1* | 9/2016 | Carson | H04L 63/0227 |
| 2017/0118249 A1* | 4/2017 | Motukuru | H04L 12/4641 |
| 2017/0331791 A1* | 11/2017 | Wardell | H04W 12/0602 |
| 2017/0331812 A1* | 11/2017 | Lander | H04L 63/083 |
| 2017/0331813 A1* | 11/2017 | Lander | H04L 63/0815 |
| 2017/0331829 A1* | 11/2017 | Lander | H04L 67/02 |
| 2017/0331832 A1* | 11/2017 | Lander | H04L 63/0807 |
| 2018/0007059 A1* | 1/2018 | Innes | H04L 9/3234 |
| 2018/0039494 A1* | 2/2018 | Lander | H04L 63/0815 |
| 2018/0041491 A1* | 2/2018 | Gupta | H04L 63/10 |
| 2018/0041515 A1* | 2/2018 | Gupta | G06F 21/53 |
| 2018/0063143 A1* | 3/2018 | Wilson | H04L 67/32 |
| 2018/0077138 A1* | 3/2018 | Bansal | H04L 63/0815 |
| 2018/0077144 A1* | 3/2018 | Gangawane | H04L 63/10 |
| 2018/0083967 A1* | 3/2018 | Subramanian | G06F 8/65 |
| 2020/0244638 A1* | 7/2020 | Gupta | G06F 9/50 |

\* cited by examiner

Functional user's environment allocation process

- 1005 — User 101 accesses the authentication module 110 via any type of media or communication module 102-A
- 1010 — The authentication module 110 verifies the user's 101 credentials against the credentials stored in the external user's ID database 150
- 1015 — The encryption module 120 exchanges keys with the authenticated user, enabling henceforth encrypted communication between the user 101 and the system
- 1020 — The user's 101 authorization level is set by the authorization module 130, and a predefined set of privileges and access levels are attributed to the user 101 according to the data stored in the External user's ID Database 150
- 1025 — In case the user is authenticated, a dedicated, isolated "functional user" software execution environment 164 is allocated for user 101 within the user area 160.
- 1030 — Restrictions of access to system resources are imposed on user 101 as dictated by the authorization module 130
- 1035 — User 101 may create multiple protected execution environments within the said independent "functional user" zone 164, by means of hardware virtualization.

Fig. 3

SYSTEM AND METHOD FOR SECURING ELECTRONIC DEVICES

FIELD OF THE INVENTION

The present invention generally relates to the field of data security in embedded computing systems, and more specifically to the architecture of hardware security solutions for embedded systems.

SUMMARY OF THE INVENTION

The present invention discloses a secured system for authenticating a user's identity and facilitating execution of embedded software and access to specific hardware modules by said user according to an authorization level. The system comprises:
- a communication interface (102A'), enabling a user to interface the secured system (100);
- an authentication module (110), configured to authenticate said user's identity;
- an authorization module (130), associated with a first processor and a computer readable storage device on which are stored modules of firmware code executable by said first processor, whereupon execution of said firmware code by said first processor determines an authorization level and access privilege associated with said user, according to a user authorization policy;
- at least one Software Execution Environment (SEE, 162, 164, 166), comprising at least a second processor (162-A, 164-A, 166-A) and a readable storage device (162-C, 164-C, 166-C, 162-J, 164-J, 166-J), on which are stored modules of firmware instruction code executable by said user on said second processor; and
- at least one hardware switch (131a), controllable by said authorization module and configured to physically enable or disable data transfer over a data path between the user and the SEE.

Successful authentication of said user by the authentication module, will cause the authorization module to allocate hardware resources at the SEE for the said authenticated user, and to configure the at least one hardware switch to enable transfer of data between the user and the SEE, so as to enable the user to execute embedded code on the at least one second processor according to the user's authorization level.

According to some embodiments, the authorization module (130) is associated with a database (150) on which are stored parameters of user authorization policy that are deterministically set prior to the deployment of the system, and may not be changed after deployment, including:
- at least one user authorization level(s);
- access privileges assigned to each authorization level; and
- identity of at least one access-managed hardware module(s) (180).

According to some embodiments, the authorization module (130) is associated with a database (140) on which are stored parameters of user authorization policy that are configurable by an administrator after the deployment of the system, including:
- identity of specific users and/or groups of users; and
- authorization levels attributed to each user and/or user groups.

According to some embodiments, the SEE is associated with an access control manager (170), configured to enforce the user's access privileges to hardware modules (180), said access control manager comprising:
- a switch controller (162-E, 164-E, 166-E), configurable by the said authorization module according to the user's authorization level;
- at least one hardware switch (162-F, 164-F, 166-F), controllable by said switch controller, wherein said hardware switch(es) are configured to physically enable or restrict the user's access via the SEE's processor (162-A, 164-A, 166-A) to specific on-chip or off-chip hardware modules (103, 104, 105), according to the switch controller's configuration by the authorization module.

According to some embodiments, the access control manager (170) is comprised within at least one of the SEEs (162-A, 164-A, 166-A).

According to some embodiments, the hardware switch(es) are configured to enforce the user's access privileges to specific hardware modules by physically enabling or disabling a hardware data path between the communication interface (102A') and a specific access-managed hardware module (180), according to the switch controller's configuration by the authorization module.

According to some embodiments, the access control manager (170) is associated with access control hardware modules (162-H, 164-H, 166-H), configured to refine hard-decisions of users' access restriction to hardware modules (180) imposed by said hardware switches (162-F, 164-F, 166-F). According to some embodiments, the access control hardware modules are comprised within the access control manager (170).

According to some embodiments, the secured system 100 comprises at least two SEEs (162, 164, 166), wherein each SEE is deterministically configured to enable separate execution of predefined firmware on each SEE processor (162-A, 164-A, 166-A), and/or access hardware modules (180) according to said authenticated user's authorization level, so as to facilitate different functionality of said SEEs and/or hardware modules (180).

According to some embodiments, the switch controller is configured by the authorization module to control specific hardware switches (162-F, 164-F, 166-F) so as to enable or disable specific signals of specific hardware modules (103, 104, 105), including an input Clock (CLK) signal and/or a supply voltage (VCC), according to the user's authorization level.

According to some embodiments, the switch controller is configurable by the authorization module via the SEE's processor.

According to some embodiments, the secured system comprises a plurality of hardware-separated, independent Software Execution Environments (SEEs, 162, 164, 166), each enabling independent execution of software on the SEEs' processors (162-A, 164-A, 166-A), and access to hardware modules (180) by either the same or a different authenticated user, according to said user'(s) level of authorization.

According to some embodiments, the plurality of hardware-separated, independent SEEs are deterministically configured to enable execution of predefined firmware and access predefined hardware modules according to predefined user authorization levels, and wherein authenticated users are routed by at least one hardware switch (131b) to an SEE that matches their authorization levels at a beginning of a session, and wherein said users are not able to access another SEE for the duration of their session.

According to some embodiments, the state of switches (131a, 131b, 162-F, 164-F, 166-F) and access control hardware modules (162-H, 164-H, 166-H) is set at the beginning of a user's session, after a successful authentication of the user's identity by the authentication module (110), and may not be changed for the duration of the user's session.

According to some embodiments, the parameters pertaining to the users' session end are configurable by an administrator either before the system's deployment, or afterwards, and include:
- conditions for ending of a user's session; and
- state of the system's switches (131a, 131b, 162-F, 164-F, 166-F) and access control hardware modules (162-H, 164-H, 166-H) directly following the end of a user's session.

According to some embodiments, at least one of said plurality of independent SEEs is a default users' SEE (166), configured to require no user authentication, and provide predefined default authorization levels for executing software and predefined default access privileges for accessing hardware modules (180).

According to some embodiments, at least one of said plurality of independent SEEs is a functional users' SEE (164), configured to require user authentication for access, and provide preconfigured authorization levels for executing embedded software and accessing hardware modules (180).

According to some embodiments, at least one of said plurality of independent SEEs is an administrators' SEE (162), configured to require administrative authentication for access, and provide authorization levels for configuring elements of the system, executing embedded software and accessing hardware modules (180);

According to some embodiments, the system further comprises an encryption module (120), configured to implement any cryptographic function required to maintain the security of data transaction between the communication interface (102A') and SEEs, wherein said encryption module is connected via said hardware switch (131a) to the authorization module (130), and wherein the encryption module (120) is connected via at least one other hardware switch (131b) to at least one SEE(s) (162, 164, 166), and wherein said hardware switches (131b) are controllable by said authorization module (130) to connect or detach the communication interface (102A') to said SEE(s) according to said user's authorization levels.

According to some embodiments, the SEE(s) (162, 164, 166) further comprise an interrupt controller (162-B, 164-B, 166-B), and wherein the authorization module (130) is configured to detect a user's attempt to access a restricted memory address or an access protected hardware module (103, 104, 105), and the interrupt controller is configured to trigger an asynchronous interrupt to the processor (162-A, 164-A, 166-A) in response to said detected attempt by the authorization module 130.

According to some embodiments, the processors of independent SEEs (162-A, 164-A, 166-A) facilitate a plurality of protected software execution sessions through hardware virtualization, thus enabling simultaneous execution of software code on the same SEE hardware, and utilization of the same hardware modules (180) by multiple users.

According to some embodiments, each of said plurality of software execution sessions is associated with an independent SEE (162, 164, 166), and wherein said SEEs are configured to communicate amongst themselves, to control the utilization of common hardware resources (103, 104, 105), thus effectively duplicating the utilization of said resources among said plurality of software execution sessions.

According to some embodiments, the secured system (100) is deployed on a plurality of devices, wherein at least one of said hardware modules (180) of said devices is a communication module, thus creating duplicate, separate networks, which co-exist on, and are bridged by a single said communication module.

According to some embodiments, at least one of said access-managed hardware module(s) (180) comprises at least one third processor, and wherein said third processor is configured to be controllable by the processor of an SEE (162-A, 164-A, 166-A), thus enabling the system to grant an authenticated user control over said third processor, via said SEE processor, according to said user's authorization level.

The present invention further discloses a method for authenticating a user's identity and facilitating execution of embedded software and access to specific hardware modules by said user according to an authorization level, system comprising the steps of:
- enabling a user to interface the system (100) via a communication interface (102A');
- authenticating said user's identity by an authentication module (110);
- determining authorization level and access privilege associated with said user, according to a user authorization policy, by an authorization module (130);
- allocating hardware resources at a Software Execution Environment (SEE, 162, 164, 166) for the said authenticated user; and
- configuring at least one hardware switch, to enable transfer of data between the user and the SEE, so as to enable the user to execute embedded code on a processor (162-A, 164-A, 166-A) incorporated within said SEE, according to the user's authorization level.

According to some embodiments, the said method further comprises the step of storing parameters of user authorization policy that are deterministically set prior to the deployment of the system, and may not be changed after deployment, including:
- at least one authorization level(s);
- access privileges assigned to each authorization level; and
- identity of at least one access-managed hardware module(s) (180).

According to some embodiments, the said method further comprises the step of storing parameters of user authorization policy that are configurable by an administrator after the deployment of the system, including:
- identity of specific users and/or groups of users; and
- authorization levels attributed to each user and/or user groups.

According to some embodiments, the said method the user's access privileges to hardware modules (180) are enforced by applying the steps of:
- configuring a switch controller (162-E, 164-E, 166-E) according to the user's authorization level; and
- controlling at least one hardware switch (162-F, 164-F, 166-F), by said switch controller, so as to enable or restrict the user's access via the SEE's processor (162-A, 164-A, 166-A) to specific on-chip or off-chip hardware modules (103, 104, 105), according to the switch controller's configuration.

According to some embodiments, the said method further comprises the step of configuring said hardware switch(es) to enforce the user's access privileges to specific hardware modules by physically enabling or disabling a hardware data path between the communication interface (102A') and a specific access-managed hardware module (180), according to the switch controller's configuration.

According to some embodiments, the said method further comprises the step of configuring access control hardware modules (162-H, 164-H, 166-H) to refine hard-decisions of users' access restriction to hardware modules (180) imposed by said hardware switches (162-F, 164-F, 166-F).

According to some embodiments, the said method further comprises the step of deterministically configuring at least two SEEs (162, 164, 166), to enable separate execution of predefined firmware on each SEE, and/or access hardware modules (180) according to said authenticated user's authorization level, so as to facilitate different functionality of said SEEs and/or hardware modules (180).

According to some embodiments, the said method further comprises the step of configuring the switch controller is to control specific hardware switches (162-F, 164-F, 166-F) so as to enable or disable specific signals of specific hardware modules (103, 104, 105), including a Clock (CLK) signal and/or a supply voltage (VCC) signal, according to the user's authorization level.

According to some embodiments, the said method further comprises the step of configuring the switch controller by the authorization module via the SEE's processor.

According to some embodiments, the said method further comprises the step of enabling independent execution of software on a plurality of SEEs, and access to hardware modules (180) by either the same or a different authenticated user, according to each user'(s) level of authorization.

According to some embodiments, the said method further comprises the steps of:
  deterministically configuring each of said plurality independent SEEs to enable execution of predefined firmware and access predefined hardware modules according to predefined user authorization levels, and
  routing authenticated users by at least one hardware switch (131b) to an SEE that matches their authorization levels at a beginning of a session, and wherein said users are not able to access another SEE for the duration of their session.

According to some embodiments, the said method further comprises the step of setting the state of said hardware switches (131a, 131b, 162-F, 164-F, 166-F) and access control hardware modules (162-H, 164-H, 166-H) at the beginning of a user's session, after a successful authentication of the user's identity by the authentication module (110), and not enabling said state to be changed for the duration of the user's session.

According to some embodiments, the said method further comprises the step of configuring parameters pertaining to the users' session end by an administrator, either before the system's deployment or afterwards, including:
  conditions for ending of a user's session; and
  state of the system's switches (131a, 131b, 162-F, 164-F, 166-F) and access control hardware modules (162-H, 164-H, 166-H) directly following the end of a user's session.

According to some embodiments, the said method further comprises the step of configuring at least one of said plurality of independent SEEs as a default users' SEE (166): requiring no user authentication, and providing predefined default authorization levels for executing software and predefined default access privileges for accessing hardware modules (180).

According to some embodiments, the said method further comprises the step of configuring at least one of said plurality of independent SEEs as a functional users' SEE (164): requiring user authentication for access, and providing preconfigured authorization levels for executing embedded software and accessing hardware modules (180).

According to some embodiments, the said method further comprises the step of configuring at least one of said plurality of independent SEEs is an administrators' SEE (162): requiring administrative authentication for access, and providing authorization levels for configuring elements of the system, executing embedded software and accessing hardware modules (180);

According to some embodiments, the said method further comprises the steps of:
  implementing any cryptographic function required to maintain the security of data transaction between the communication interface (102A') and SEEs by an encryption module (120);
  connecting said encryption module is via a hardware switch (131a) to the authorization module (130);
  connecting said encryption module (120) via at least one other hardware switch (131b) to at least one SEE(s) (162, 164, 166); and
  controlling said hardware switches (131b) by said authorization module (130) to connect or detach the communication interface (102A') to said SEE(s) according to said user's authorization levels.

According to some embodiments, the said method further comprises the steps of:
  configuring the authorization module (130) to detect a user's attempt to access a restricted memory address or access a protected hardware module (103, 104, 105); and
  configuring an interrupt controller to trigger an asynchronous interrupt to a processor (162-A, 164-A, 166-A) of the SEE in response to said detected attempt by the authorization module (130).

According to some embodiments, the said method further comprises a step of configuring said processors (162-A, 164-A, 166-A) of said independent SEEs (162-A, 164-A, 166-A) to facilitate a plurality of protected software execution sessions through hardware virtualization, thus enabling simultaneous execution of software code on the same SEE hardware by multiple users.

According to some embodiments, the said method further comprises the step of configuring said plurality of protected software execution sessions to enable simultaneous utilization of the same hardware modules (180) by multiple users.

According to some embodiments, the said method further comprises the steps of configuring at least two of said plurality of independent SEEs (162, 164, 166) to communicate amongst themselves, so as to control the utilization of common hardware resources (103, 104, 105), and effectively duplicate the utilization of said resources among said plurality of software execution sessions.

According to some embodiments, the said method further comprises the step of deploying said SEEs on a plurality of devices, and wherein at least one of said hardware modules (180) of said devices is a communication module, thus creating duplicate, separate networks, which co-exist on, and are bridged by a single said communication module.

According to some embodiments, the said method further comprises the step of configuring a processor on one of said access-managed hardware module(s) (180) to be controllable by the processor of an SEE (162-A, 164-A, 166-A), thus enabling to grant an authenticated user control over said access-managed hardware module processor, via said SEE processor, according to said user's authorization level.

BRIEF DESCRIPTION OF THE DRAWINGS

FIG. 3 presents a flow diagram, elaborating the allocation process of an isolated SEE to a user, according to one embodiment of the present invention.

DETAILED DESCRIPTION OF SOME EMBODIMENTS OF THE INVENTION

Figure 1:
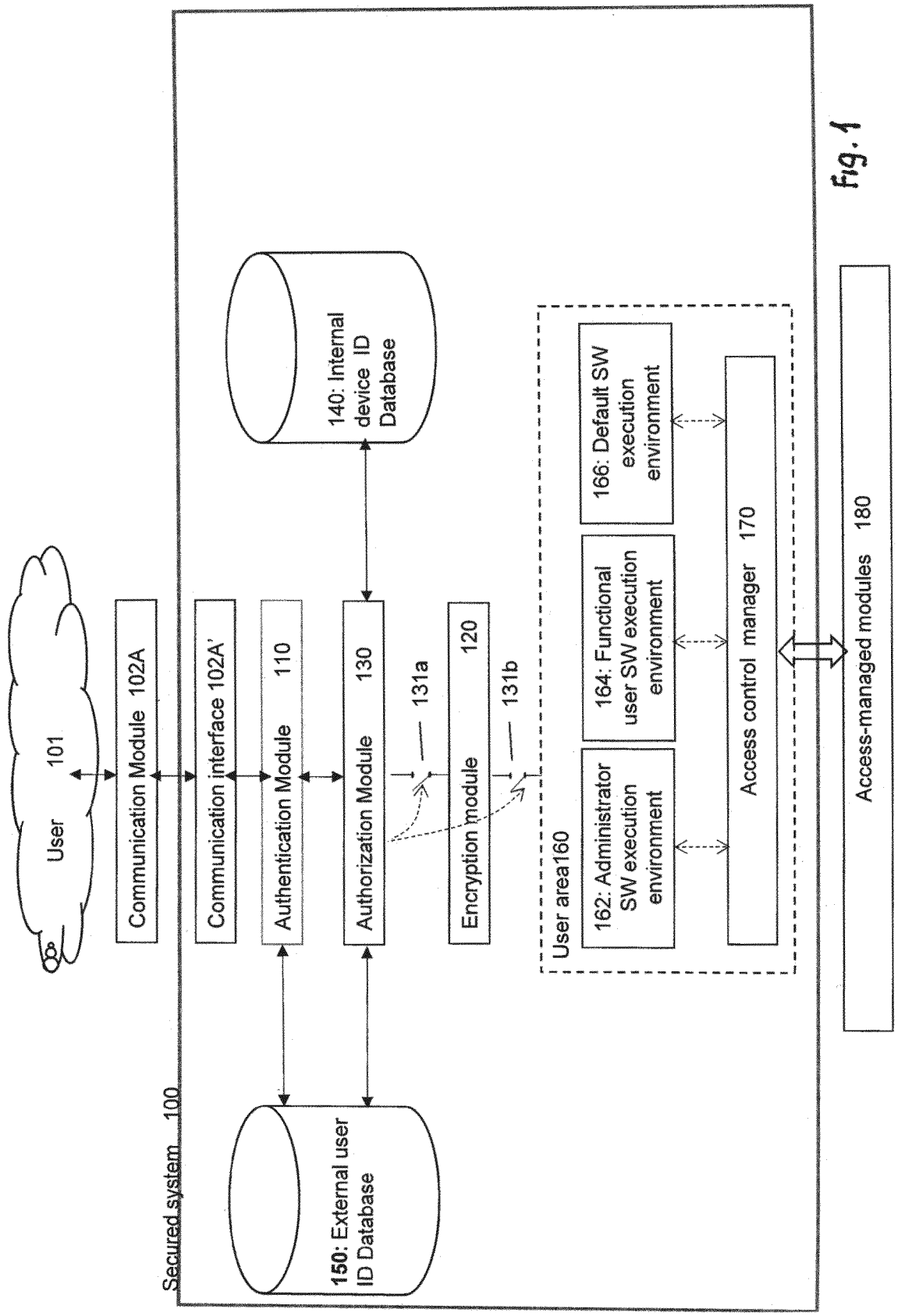
FIG. 1 presents a schematic block diagram of the secured system according to one embodiment of the present invention.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

Following is a table of definitions of the terms used throughout this application.

| Term | Definition |
| --- | --- |
| User | An entity that accesses the secured system for the purpose of performing actions such as reading or writing from a memory instance or actuating an access-restricted device, or an entity operating within the secured system, accessing a second system, secured or non-secured, for the purpose of performing such actions.<br>A user may be a real person or a digital persona, or a process or operation pertaining to such digital persona. |
| Security modules | The term "security modules" is used throughout this document to cumulatively refer to modules of the secured system that are configured to facilitate access of specific users to various protected hardware modules. According to some embodiments, these "security modules" include at least part of: the authentication module, authorization module and encryption module. |
| Authorization level/Access privileges | Authorization level is an attribute of specific users or user groups (e.g. default, functional or administrative users). Each authorization level is associated with access privileges, defining their enablement to:<br>   configure specific elements within the system;<br>   execute embedded firmware within a Software Execution Environment (SEE, see below); and<br>   access specific hardware modules, either within, or connected to the secured system. |
| Authorization policy | A plurality of parameters, defining the system's interaction with a user, ultimately defining the user's access privileges to specific SEEs and hardware components. These parameters include at least part of:<br>   a plurality of user authorization levels (e.g. default, functional and administrative);<br>   identity of a plurality of access-managed hardware modules;<br>   identity of specific users and/or groups of users; and<br>   authorization levels assigned to each user and/or user groups (e.g. whether a specific user is an administrator or a functional user).<br>   access privileges assigned to each authorization level (e.g. which hardware modules are accessible to users of administrative authorization levels); |
| External administrator | An individual possessing an elevated authorization level for configuring the system prior to its deployment. This normally includes:<br>   Setting and updating the firmware of the system's security modules, and<br>   deterministically allocating hardware resources to specific authorization levels (e.g. administrator, functional user, default user - see below).<br>The external administrator would normally be a manufacturer or vendor of the secured system. |

-continued

| Term | Definition |
|---|---|
| Internal administrator | A user who possesses elevated access privileges for dynamically maintaining and configuring the system after it has been deployed. This typically includes: <br> Setting and updating embedded firmware pertaining to the different SEEs (e.g. administrators' environment, functional users' environment and default environment, see below). <br> Setting individual users' group membership; <br> Attributing a level of authorization to specific users; and <br> Attributing level of authorization to specific user groups. <br> The internal administrator would typically be a system administrator within a plant or company whereat the secured system is deployed. |
| User session | A user's session starts when the user's identity is authenticated by the secured system. <br> The conditions for ending a user's session, as well as the system's state following this ending may be either deterministically predefined by an external administrator prior to the deployment of the secured system, or configured by an internal administrator after deployment. |
| User area | The user area is the heart of the secured system. It comprises hardware-separated, independent SEEs. |
| Software Execution Environment (SEE) | A hardware platform within the secured system, comprising at least a processor and a readable storage device, on which are stored modules of firmware instruction code executable by a user on the said processor. <br> According to some embodiments, the secured system comprises more than one SEE, wherein each SEE executes its respective firmware instruction code independent of other SEEs within the secured system. |
| Default users' SEE | An independent SEE encompassed within the user area. <br> According to some embodiments, the default user environment does not require authentication in order to gain access, and is characterized by a typically low level of authorization and limited access privileges to the secured system's hardware resources. |
| Functional users' SEE | An independent SEE encompassed within the user area. The functional user environment is characterized by configurable access privileges to system resources. According to some embodiments, the system may comprise of different types of functional user environments, to accommodate different authorization levels, and provide different hardware resource access privileges. |
| Administrators' SEE | An isolated SEE encompassed within the user area. The administrator environment normally possesses complete access and configuration privileges to every aspect of the secured system. |

The present invention discloses a system, which is configured to implement "security as an embedded service"; a term that is utilized to describe a Software Execution Environment (SEE) that is embedded in hardware architecture, and provides built-in, multiple levels of data protection and security controls.

The present invention addresses the security needs of a wide range of devices, intended for deployment by various types of consumers, including for example devices employed for industrial, military or medical applications.

According to one aspect of the system presented herein, the system is comprised of separate hardware modules, each of which performs a specific security task e.g.: authentication, authorization, accounting, encryption, and facilitation of protected firmware execution in a Software Execution Environment (SEE).

The secured system maintains predefined user groups, each of which is assigned a protected SEE, characterized by a different level of authorization and access privileges, e.g.: default privileges, functional privileges and administrative privileges.

According to some embodiments, the secured system 100 and the Software Execution Environments (SEEs) incorporated therein may be implemented by any type of hardware architecture, including that of a System on Chip (SoC), a System in Package (SiP), Multi Chip Modules (MCMs) System on Package (SoP) or any set of discrete electronic components.

According to some embodiments, the secured system 100 may be deployed to function as Internet of Things (IOT) and Machine to Machine (M2M) devices.

According to some embodiments, the allocation of hardware resources as a function of predefined authorization levels is set deterministically through hardware by an external administrator. This is done prior to the deployment of the system. For example, consider a secured system that is implemented as a System on a Chip (SOC):

The external administrator of the secured system (e.g.: manufacturer of the SOC in this example) may determine an authorization policy that grants access to specific modules (e.g. GPIO ports of the SOC) only to functional (i.e. authenticated) users, but not to default users (i.e. non-authenticated, "guest" users).

The external administrator sets the firmware embedded within the secured system's security modules. For example, the external administrator may set the firmware of the authorization module on the SOC to dictate the said secured system's authorization policy.

The external administrator may implement hardware switches, configured to enable access to the specific hardware modules (e.g. GPIO ports) only to users who have authenticated their identity through the system's authentication modules.
In this example, access to the GPIOs is deterministically set as a function of the user's identification and of the predefined authorization policy. The attribution of access to specific hardware modules according to authorization levels is irreversible, and is maintained as long as the SOCs are deployed.

According to some embodiments, specific aspects of the authorization policy are dynamically maintained by an internal administrator, after the deployment of the system. This typically includes:

Setting individual users' group membership;
Setting specific users' levels of authorization; and
Setting specific user groups' levels of authorization.

For example, consider a secured system that is implemented within an Internet of Things (IOT) device that is to be deployed within a plant.

The IOT device's manufacturer (i.e.: an external administrator) will have already implemented hardware switches within the device, configured to enable access to specific hardware modules (e.g.: communication drivers) according to predefined authorization levels.

An internal administrator within the plant may grant a specific user access to the said hardware modules on the IOT devices by setting the said user as a member of a specific users' group, and attributing a predefined authorization level to that group.

According to some embodiments, the secured system facilitates creation of software-separated, protected execution environments within the said independent SEEs, by means of hardware virtualization. For example, two or more users may simultaneously employ the same SEE to execute different embedded firmware instruction codes on the SEE's processor.

According to some embodiments, the secured system facilitates the capability of remote secure management. For example, external administrators may remotely interface the secured system, through wired or wireless communication methods to modify the embedded firmware on the secured system's security modules, and internal administrators may remotely interface the secured system to:

update properties of the authorization policy, and
update embedded firmware code within the secured system's SEEs.

FIG. 1 presents a schematic block diagram of the system according to some embodiments of the present invention. The system incorporates at least one of the following separate hardware modules, each of which performs a specific security task.

When a user 101 attempts to access the system via any kind of communication module 102, their credentials are verified by the authentication module 110 against the credentials of users stored in the external user's ID Database 150. The authentication module 110 implements any method of authentication (e.g. password authentication, cryptography-based or biometry-based authentication). It is not restricted to any specific method of authentication.

The encryption module 120 implements any cryptographic function required to maintain the security of data transaction from and to the secured system 100. According to some embodiments, encryption may also be applied between different modules of the secured system 100, e.g. between any module of the secured system and the databases it employs. The encryption module 120 is configurable by administrative users, and is not restricted to any specific type of cryptographic algorithm.

The authorization module 130 implements a policy of authorization, determining the types and qualities of activities, resources, and services specific users are permitted to access. The action of the authorization module 130 is normally subsequent to a successful user's authentication 110 process.

According to some embodiments, the authorization module 130 is associated with a processor and a computer readable storage device on which are stored modules of firmware code executable by the processor. Execution of the firmware code by the authorization module 130 processor implements the said authorization policy.

According to some embodiments, the authorization module 130 firmware code is installed by an external administrator (e.g. the manufacturer or vendor of the system) prior to the system's deployment, and deterministically sets the different levels of authorization and access privileges throughout the lifetime of the security system. According to this embodiment, internal administrators (e.g. system administrators in an organization or a plant wherein the secured system is deployed) are entitled to attribute specific authorization levels to specific users and specific user groups according to their preferences, by changing specific parameters stored on the external users' database 150.

The authorization module 130 enforces the authorization policy by controlling the access control manager 170 module and hardware switches 131a 131b, as explained further below.

According to some embodiments, the authorization module 130 controls at least one switch (131a, 131b), routing and directing the flow of data between the authorization module 130 and the encryption module 120, and between the encryption module 120 and a specific SEE (162, 164, 166) within the user area 160. This embodiment enables the authorization module 130 to:

Deny access of unauthenticated ('guest') users to SEEs, or route unauthenticated users to the default SEE (166);
Deny access of users who have failed to authenticate their identity by the authentication module 110 to SEEs, or route these users to the default SEE (166);
Route authenticated functional users to the functional users' SEE (164);
Route authenticated administrators to the administrators' SEE (162). Hardware switches 131a, 131b enforce authorization policies of roles and permissions per each user, by either enabling or disabling users from accessing Software Execution Environments (SEEs, 162, 164, 166). According to one embodiment of the present invention, the authorization module 130 a-priori stores the status of each hardware switch 131a, 131b in respect to the predefined different levels of authorization (e.g. Administrator users are granted complete access to all hardware modules within the secured system 100). The condition of switches 131a, 131b are set to their predefined status before any data is propagated to the user area 160, and cannot be altered during a user's session. This restriction prevents hackers from exploiting low-level authorization login (e.g. login of functional users) in order to perform high-level authorization actions (e.g. access memory regions that are reserved for administrators).

The external identification database 150 stores identification information relating to devices and systems that are linked to the secured system 100 by any method or protocol of communication. Such information may, for example, include the linked device's ID, or a public key for encrypted communication.

The internal identification database 140 stores identification information relating to authorized users. This information includes, for example:
  credentials and identification of users (e.g. name, password, biometric data);
  users' and user groups' levels of authorization;
  access privileges for specific hardware resources;
  users' group membership;
  users' project assignment; and
  role of an individual user in an organization.

Modules 110, 120, 130, 140 and 150 are henceforth cumulatively referred to as the present invention's "security modules". Functional users and default users will normally not possess write permissions to the system's security modules (i.e. 110, 120, 130, 140, 150). Access to these modules would normally be restricted to internal administrators and external administrators, as explained further below.

The user area 160 is the heart of the secured system. According to some embodiments, it comprises at least one Software Execution Environment (SEE: 162, 164, 166) and an access control manager 170, the function of which is elaborated below.

SEEs are hardware platforms, incorporated within the secured system, comprising at least a processor and a readable storage device, on which are stored modules of firmware instruction code executable by the said processor.

According to some embodiments, the secured system comprises more than one SEE, wherein each SEE executes its respective firmware instruction code independent of other SEEs within the secured system. According to these embodiments, each SEE:
  pertains to a specific user and to the user's level of authorization throughout the duration of the user's session;
  employs dedicated, physically independent hardware per each authenticated user; and
  facilitates creation of multiple, virtual execution environments, for utilizing the same hardware platform by multiple users, by means of hardware virtualization.

According to some embodiments, the independent SEEs that are comprised within the user area 160 are categorized according to their different levels of authorization. This categorization includes, for example:
  The administrators' SEE 162 is granted the maximal level of authorization. It accommodates the different functions required in order to configure the system, as well as to access all system-related hardware modules.
  The functional users' SEE 164 does not normally possess system configuration privileges. It does grant the group of functional users access privileges to predefined on-chip and off-chip modules, and enables functional users to execute software according to their authorization levels. According to some embodiments of the invention, multiple levels of authorization may be defined within the group of functional users. This may serve, for example, to categorize functional users according to different roles and permissions within an organization.
  The default user SEE 166 provides limited access privileges to users who are not entitled to full levels of authorization. For example: 'guest' users, who are not required to authenticate their identity may use the default user SEE 166 to execute basic software and access basic hardware modules through this SEE 166.

According to the embodiment portrayed in FIG. 1, the number of isolated, independent SEEs is exactly 3 (i.e. the administrator SEE 162, functional user SEE 164 and default user SEE 166). However, according to other embodiments, the number of hardware separated, independent SEEs may be changed to fit any required scheme of access to system resources. For example, more than one functional users' SEE can be defined, enabling to manage different groups of users, each having different authorization levels.

The access control manager 170 implements the policy dictated by the authentication module, enabling the software executed in SEEs of the user area 160 to interface a restricted, predefined set of specific access-managed hardware modules 180. These include on-chip and off-chip hardware and memory modules, including, for example, IoT and M2M modules, serial communication modules (e.g. $I^2C$, UART), GPIO ports, wired and wireless network switches, memory devices etc. The functionality of the access control manager 170 is discussed further below, in relation to FIGS. 4,5 and 6.

Figure 2:
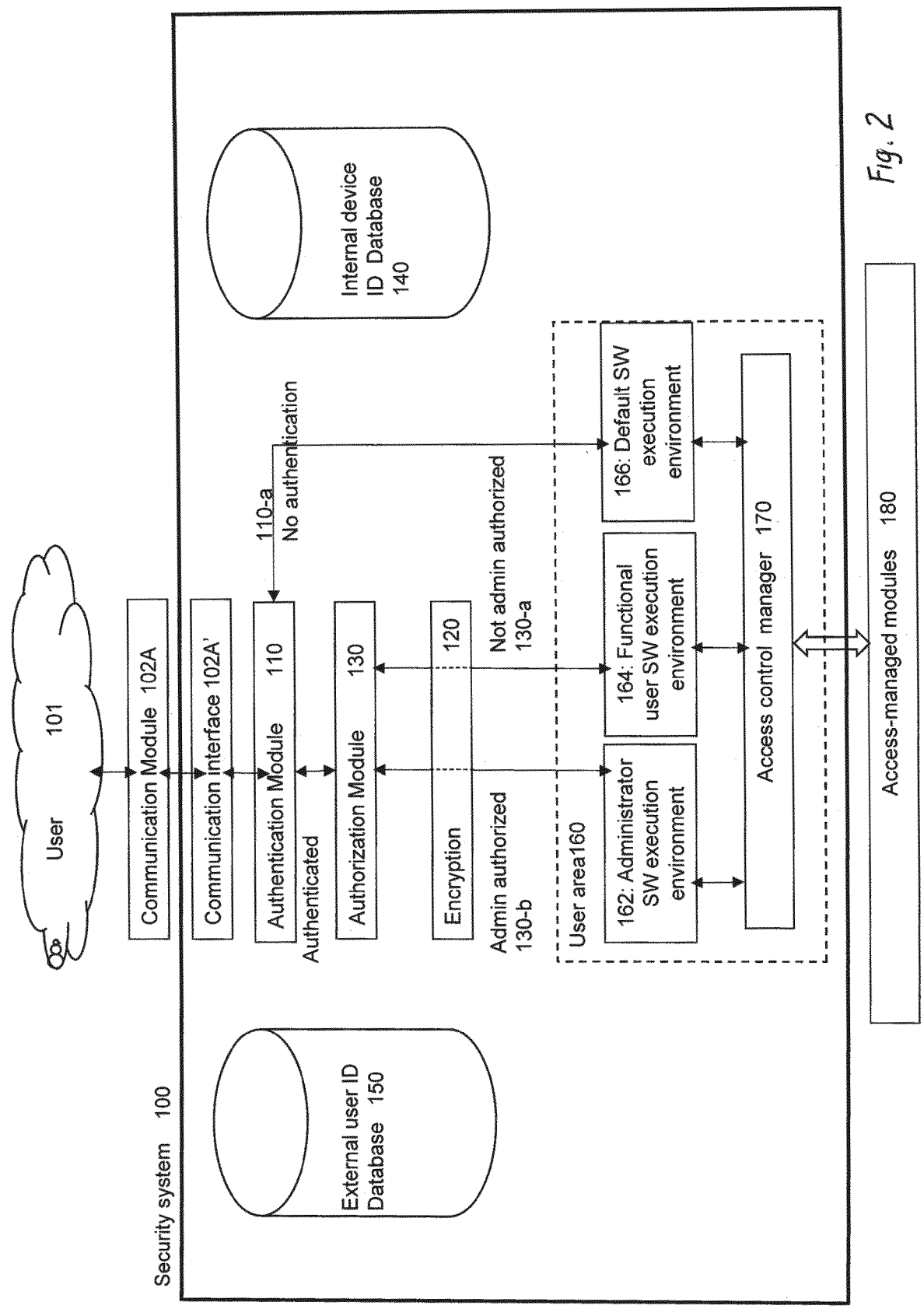
FIG. 2 presents a schematic block diagram, depicting the flow of data between an end user and access-managed modules via the Software Execution Environments (SEEs) embedded in the user area.

FIG. 2 presents a schematic flow diagram, depicting the flow of data between end users 101 and access-managed hardware modules 180 via the SEEs of the user area 160.

As explained above, when a user 101 attempts to access the system via the communication interface 102A', their credentials are verified by the authentication module 110.

According to one embodiment of the present invention, in the case of failed user authentication in the authentication module 110, the authorization module 130 will direct user data 110-a to the default SEE 166 in a non-encrypted format. The default SEE 166 provides a predefined, limited set of execution privileges, and a limited, predefined set of access-managed modules 180.

Users that have been authenticated will have their data directed by the authentication module 110 to the authorization module 130. The authorization module will verify the authenticated user's authorization level and dictate the consequent permissions and resources allocated to that user. According to one embodiment, a distinction is made between functional users, and Administrators.

A user's session starts when the user's identity is authenticated by the authentication module 110. The process of authentication and subsequent authorization opens a hardware path for the authenticated user, according to that user's authorization level. The said hardware path is implemented by hardware switches (131a, 131b—see FIG. 1), and is characterized by low latency and fast response: an inherent hardware merit.

Authorized functional users will be allocated hardware resources (e.g. processor cores, program and data memory space, etc.) within the Software Execution Environment (SEE) 164 to execute their software on. Such software may include, for example dedicated firmware, or preconfigured software applications.

According to some embodiments, different functional users may be attributed different, predefined sets of privileges, thus manifesting different functional users' authorization levels, possessing different levels of system access and computational capabilities. For example, functional users may be permitted to:
  access specific sets of IOs and communication modules (e.g.: $I^2C$, USB, $I^2S$, LAN, etc.)
  access specific on-chip hardware modules (e.g. GPU, DMA, CPU, memory)
  access specific off-chip hardware modules (e.g. sensors, microcontrollers)

execute specific software applications, with predefined user privileges.

According to one embodiment, administrators will be allocated a different hardware—separated execution environment 162. They will be attributed complete accessibility privileges to all on-chip and off-chip hardware modules, and will be granted elevated privileges for executing software applications on their respective execution environments 162.

According to some embodiments, access-managed hardware modules 180 including on-chip and off-chip modules are individually handled by the access control manager 170 to optimize the hardware module's operation. For example, specific hardware switches 162-F within the access control manager 170 may be configured to cut the supply voltage (VCC) or disable specific clock signals on hardware modules that are not authorized for use by the authenticated user. Such handling of access-managed hardware modules 180 is dictated by the authorization module 130, according to the authenticated user's authorization level.

In addition to the above, the administrators' execution environment 162 encapsulates all aspects of system configuration and maintenance. For example, administrators may apply any of the following actions:
  Update the system's firmware
  Modify the list of authorized users, and set their respective levels of authorization.
  Monitor and verify all aspects of system security, e.g.: check the integrity and permanence of all other system modules.

According to some embodiments of the present invention, each of the processors of independent SEEs (162-A, 164-A, 166-A) in the user area 160 may facilitate a plurality of protected execution environments through hardware virtualization. The benefits of such hardware virtualization are ample, and include:
  Consolidation of multi-processor execution environments into a single multi-core processor design;
  Separation between different execution environments for performance and safety considerations; and
  Simultaneously applying different software code on the same hardware. For example, the Functional user module 164 may accommodate two users that share the same privileges, simultaneously running different software.

FIG. 3 presents a flow diagram, depicting the allocation of an isolated SEE to a user 101, according to one embodiment of the present invention.

The user 101 accesses the authentication module 110 via any type of wired or wireless communication module 102A (step 1005).

The authentication module 110 verifies the user's 101 credentials against the credentials stored in the external user's ID Database 150 (step 1010).

The encryption module 120 exchanges keys with the authenticated user, enabling henceforth encrypted communication between the user 101 and the system (step 1015).

The user's 101 authorization level is set by the authorization module 130, and a predefined set of privileges and access levels are attributed to the user 101 according to the data stored in the external user's ID Database 150 (step 1020).

A dedicated, independent functional user SEE 164 is allocated for user 101 within the user area 160 (step 1025).

Restrictions of access to system resources are imposed on user 101 as dictated by the authorization module 130 (step 1030).

According to some embodiments, user 101 can create a plurality of protected execution environments within the independent functional user SEE 164, by means of hardware virtualization (step 1035).

Figure 4:
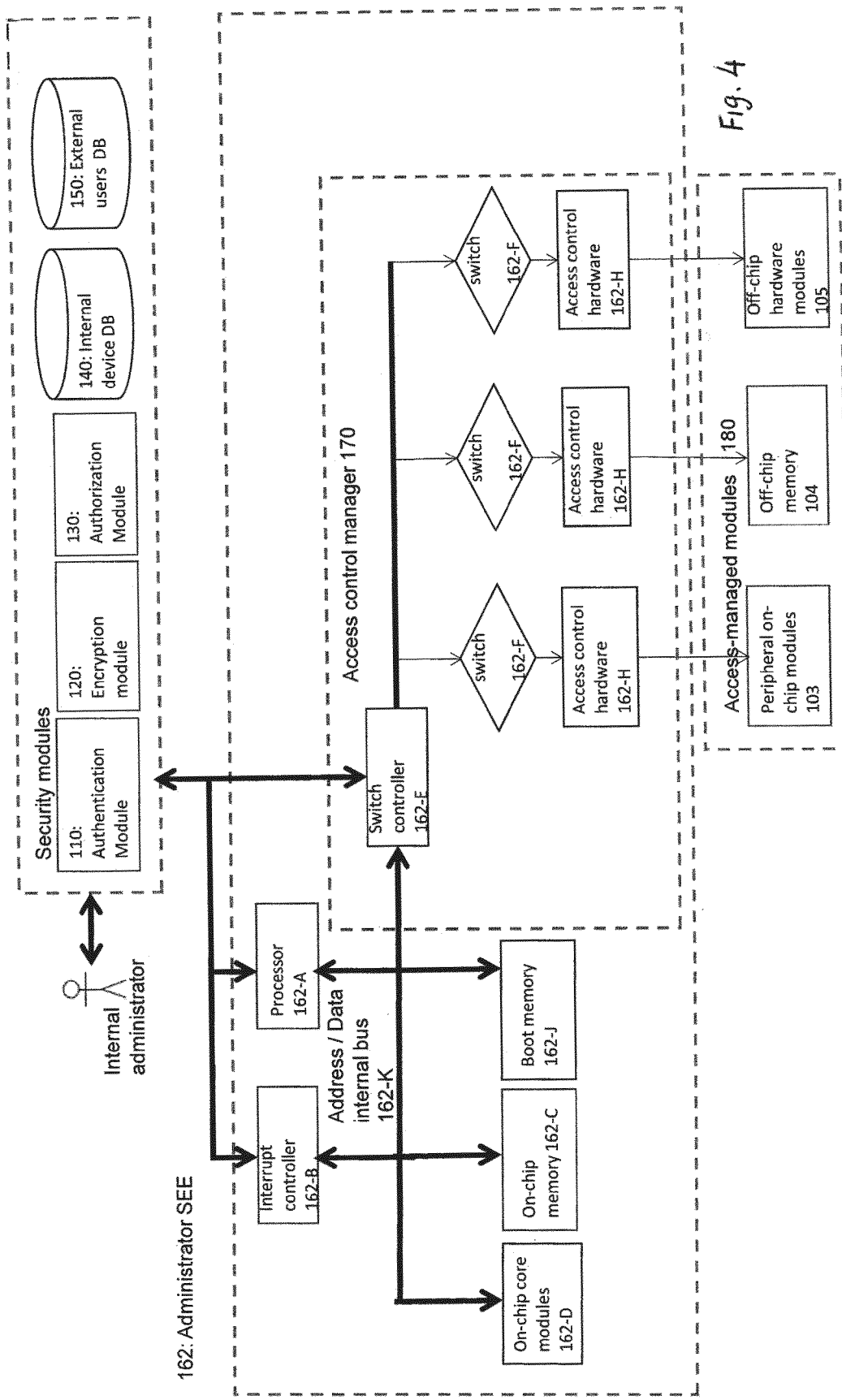
FIG. 4 presents a schematic block diagram, depicting the access of an internal administrator to different system resources, as managed by the administrators' SEE, according to some embodiments of the present invention.

FIG. 4 presents a schematic block diagram, depicting the access control of different system resources as managed by the administrator Software Execution System (SEE) 162, according to one embodiment of the present invention.

According to some embodiments the user area 160 comprises a plurality of hardware-separated, independent Software Execution Environments (SEEs, 162, 164, 166), each enabling independent execution of software by either the same or a different authenticated user, according to the user(s) level of authorization.

According to some embodiments, the different SEEs are deterministically configured, to enable execution of predefined firmware and/or access predefined hardware modules according to predefined user authorization levels (e.g. administrator, functional and default users). Authenticated users would be routed by hardware switches 131b to a designated SEE that matches their authorization levels, and will not be able to access another SEE for the duration of their session.

Such embodiments facilitate different functionality of the SEEs and hardware modules (180), according to the different users' authorization levels and access privileges. For example, the secured system (100) may be deployed within IoT devices such as smart traffic lights.
  Default users (e.g. autonomous cars passing by the traffic light) will only be granted permission to read the status (e.g. color) of the traffic light.
  Functional users (e.g. policemen) may be granted access to change the traffic lights and the switching cycle duration, either by directly accessing hardware within the traffic light (e.g. an electric relay, driving the actual lights), or by executing alternative firmware on the traffic light's processor.
  Administrative users may be granted access to the SEE's database, to update the traffic light's firmware or define which users are granted permission to execute any of the said functions.

As explained above in relation to FIGS. 1 and 2, the security modules (110, 120, 130) and switches 131a, 131b facilitate transfer of data over a data path, routing data between a user and an SEE, enabling the user to execute firmware code on the SEE's processor. In the case depicted in FIG. 4, data is routed between an authenticated administrator user and the administrators' SEE 162, enabling the administrator user to execute firmware code on the administrators' SEE's processor 162-A.

The implementation of the SEE 162 depicted in FIG. 4 comprises of elements that are normally present in SoC (System on chip) or SIP (System in Package) computational platforms that are well known to persons familiar with the art, and other elements that are unique to the implementation of the secured system.

The elements that are normally present in SOC systems include at least one of the following items:
  A main processor 162-A, configured to execute firmware code that is stored on the On-chip memory 162-C and boot memory 162-J. As explained above, the execution of said firmware code on the processor 162-A is subject to the authentication, authorization and encryption processes, respectively performed the authentication module 110, authorization module 130 and encryption module 120;

On-chip memory 162-C and boot memory 162-J, configured to store at least computer-readable firmware code that is to be executed by said processor 162-A;

An interrupt controller 162-B;

An on-chip Address and Data bus 162-K of any architecture (e.g. Harvard, Von-Newman);

On-chip core modules 162-D, such as a DMA and MMU facilitating enhanced software execution capabilities such as direct memory accessing and maintenance of a virtual memory environment;

Peripheral on-chip modules 103, such as communication modules (e.g. USB, I²C, UART, LAN) or touch screen controllers;

Off-chip memory 104 of any sort; and

Other off-chip hardware modules 105, such as sensors and motor drivers.

The elements that are unique to the present implementation include at least one of the following hardware modules: the access control manager 170 and the interrupt controller 162-B.

The interrupt controller 162-B is normally present in computational systems not necessarily related to the present invention. In the embodiment depicted in FIG. 4, the interrupt controller has been modified to support asynchronous interruption of the flow of software execution, in accordance with predefined security configurations. For example, when a user who is not authorized to access a specific function or module tries to override that restriction (e.g. by accessing specific addresses on the on-chip memory 162-C), a high-priority interrupt will be triggered, and the system will consequently deny that user's access to the respective module or memory section, or even terminate the user's session.

According to some embodiments, the authorization module 130 within the security modules' block is configured to detect a user's attempt to access a restricted memory address or an access protected hardware module, and the interrupt controller 162-B is configured to trigger an asynchronous interrupt in response to such detected attempt by the authorization module 130.

The access control manager 170 is designed to restrict access to specific hardware modules according to the user's authorization level, as dictated by the configuration of the authorization module 130. It is comprised of at least part of the following modules: a plurality of hardware switches 162-F, a plurality of access control hardware 162-H modules, and a switch controller 162-E.

The plurality of hardware switches 162-F are configured to enforce the authorization policy dictated by the authorization module 130, by physically enabling or restricting access of the SEE's processor 162-A to various, specific on-chip and off-chip modules within the access-managed modules 180 block. In the embodiment depicted in FIG. 4, these modules include peripheral on-chip modules 103, off-chip memory modules 104, and any other types of off-chip modules 105.

According to some embodiments, the plurality of hardware switches 162-F are configured to enforce the authorization policy dictated by the authorization module 130, by physically create a hardware data path between the communication interface (102A') and a specific access-managed hardware module (180), following a successful authentication of the said user's identity by said authentication module (110).

According to some embodiments, access control hardware 162-H modules participate in the enforcement of the users' authorization policy, as dictated by the authorization module 130. These hardware modules 162-H are presented in FIG. 4 as conceptual blocks that apply specific functions to each type of module or device upon which access restrictions are imposed. The access control hardware 162-H modules serve to refine the hard-decision restrictions imposed by the switches 162-F, and provide enhanced capabilities for restricting access to specific modules and functions. For example, a switch 162-F may grant read and write access to a specific off-chip memory module 104, whereas the access-control hardware modules 162-H may impose a read-only restriction to specific sections of that off-chip memory module 104.

According to some embodiments, a switch controller 162-E module is configured to control the action of the said plurality of hardware switches 162-F and access-control hardware modules 162-H, in accordance with the policy dictated by the authorization module 130. According to some embodiments, the switch controller 162-E module is configurable by an internal or external administrator via the authorization module 130. According to other embodiments, switch controller 162-E module is configurable by an internal or external administrator via the processor 162-A.

Figure 5:
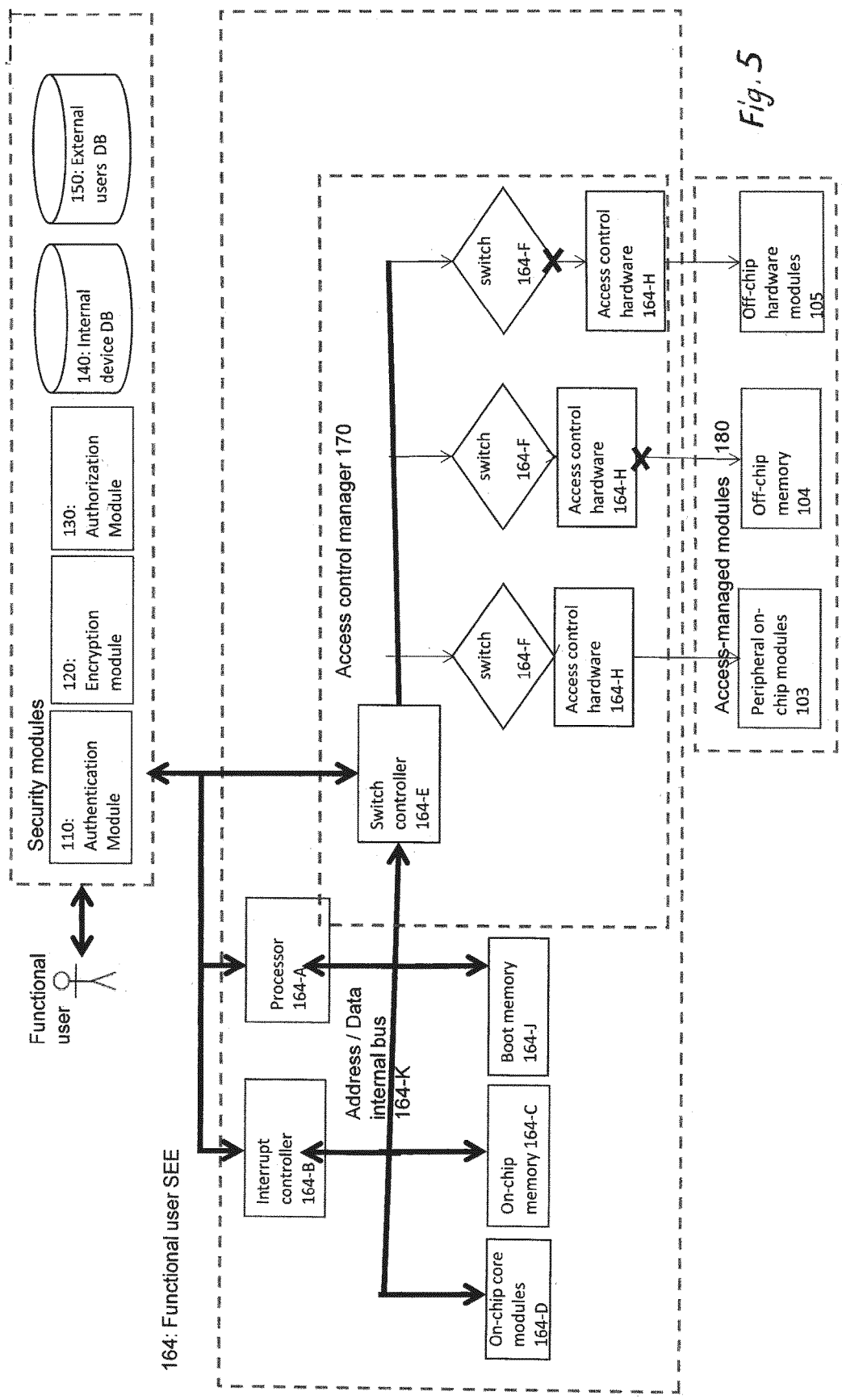
FIG. 5 presents a schematic block diagram, depicting the access of a functional user to different system resources, as managed by functional users' SEE, according to some embodiments of the present invention.

FIG. 5 presents a schematic block diagram, depicting the access control of different system resources as managed by the functional users' SEE 164, and implemented in some embodiments of the present invention.

The modules enumerated 164-A through 164-K, which reside in the functional user SEE 164, are identical to the respective modules enumerated 162-A through 162-K which reside in the administrators' SEE 162, and are elaborated above.

It is clear by way of comparison between FIGS. 4 and 5, that the depicted embodiment of the functional users' SEE 164 in FIG. 5 is identical to that of the administrators' SEE depicted in FIG. 4, except for examples of restrictions of access that are imposed on the functional users' SEE 164 by the authorization module 130. These examples are marked by 'X' symbols, and are elaborated below:

Functional users may be restricted from accessing specific off-chip hardware modules 105 (e.g. read the measurements taken by specific sensors). In this example, this restriction is imposed by a switch 164-F.

Functional users may be restricted from accessing specific off-chip memory 104 sections. In this example, this restriction is imposed by an access control hardware module 164-H. This module may, for example, restrict the access to specific IOs, or impose read-only restrictions to the entire memory space.

According to some embodiments, the external identification database 150 may include several types of functional users, and respective authorization levels for each type. For example, functional users may be grouped to match a company's distribution to Organizational Units (OUs, e.g.: engineering department, finance department etc.), each granting access to specific hardware modules (e.g.: each group granted access to a separate LAN network).

According to some embodiments, the external identification database 150 includes types of functional users that use a non-unique identification method, enabling non-specific users to interface the secured system. For example:

the secured system may be implemented within an autonomously-driving vehicle, providing restricted access to data and/or functions pertaining to the vehicle.

a non-unique smart traffic sign may be configured to interface the vehicle, in order to query the said data and/or prompt said functions (e.g.: for limiting the vehicle's speed according to its weight).

Figure 6:
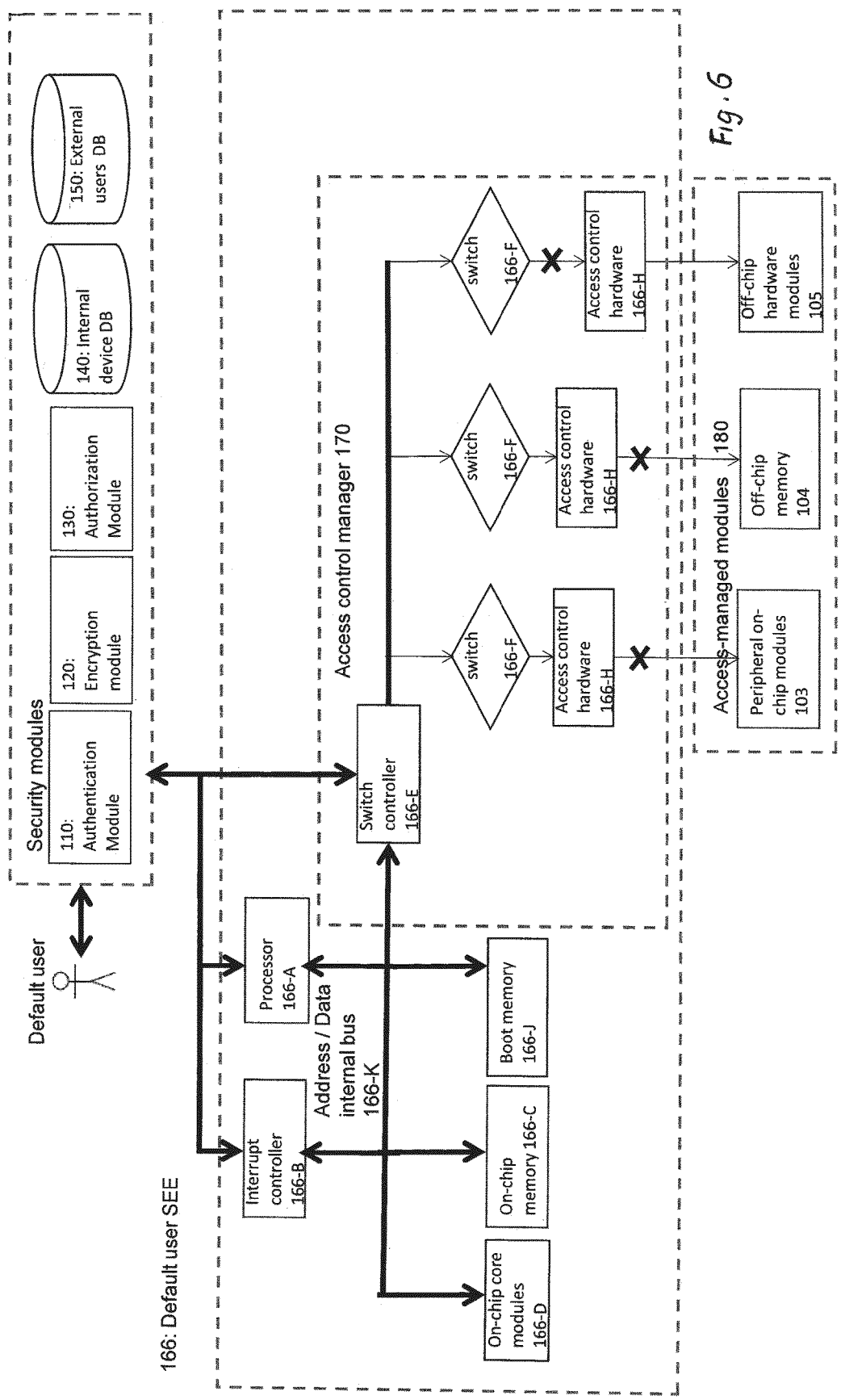
FIG. 6 presents a schematic block diagram, depicting the access of a default user to different system resources, as managed by default users' SEE, according to some embodiments of the present invention.

FIG. 6 presents a schematic block diagram, depicting the access control of different system resources as managed by the default users' SEE 166 and implemented in some embodiments of the present invention.

The modules enumerated 166-A through 166-K, which reside in the default user zone 166, are identical to the respective modules enumerated 162-A through 162-K which reside in the administrator zone, and are elaborated above.

It is clear by way of comparison between FIGS. 4 and 6, that the depicted embodiment of the default users' SEE 166 in FIG. 6 is identical to that of the administrators' SEE depicted in FIG. 4, except for examples of restrictions of access that are imposed by the authorization module 130. These examples are marked by 'X' symbols, and are elaborated below:

Default users will normally be restricted from accessing any off-chip hardware modules 105.

Default users will normally be restricted from accessing off-chip memory modules 104, other than in read-only mode.

Default users will normally be restricted from accessing peripheral on-chip modules 103, other than in read-only mode.

According to some embodiments of the present invention, the default users' SEE 166 would be presented to users without need to authenticate their identity, and will therefore normally be characterized by predefined default (e.g. read only) authorization levels for executing software and predefined default access privileges for accessing hardware modules to on-chip and off-chip hardware.

The following examples demonstrate the different aspects of the different user types:

Example 1

Assume security doors in a plant are deployed with secured systems 100 of the present invention.

Internal administrators may dictate which people, or groups of people may be permitted to enter specific security doors, and what methods of identification would be required for that purpose.

Functional users may be allowed to pass through security doors that have been predefined by the internal administrators, pending successful authentication (e.g.: fingerprint verification).

Default users may need to access doors that require no identification, or are set to open for visitors at specific timing.

External administrators dictate the roles of each user type (i.e. internal administrators, functional users and default users), and set the accessibility of each type of user to the off-chip hardware drivers—in this case by controlling hardware switches to access actuators of door locks.

Example 2

Assume an insulin pump incorporates a secured system 100 of the present invention.

An administrator may set specific users' access privileges, e.g. which user is entitled to set and modify the dosage of medication through the administrators' SEE 162.

A functional user of type 1 (e.g. a doctor) is entitled to calibrate the insulin pump, and gain access to patients' history through a $1^{st}$ functional users' SEE 164.

A functional user of type 2 (e.g. a patient) is entitled to read his/her own history, and conduct the actual injection of medication by accessing the off-chip syringe actuator through a $2^{nd}$ functional users' SEE 164.

A default user (e.g. a night-watch attendee) is entitled to read the status of the insulin syringe (e.g. the volume of administered medication) through a default users' SEE 166.

According to some embodiments of the present invention, the ending of a user's session, as well as the system's state following the ending of a user's session is either predefined by an external administrator, as part of the authorization module's 130 firmware, or configurable by an internal administrator after the system has been deployed, or any combination of the two. For example:

As explained above, a user's session starts when the user's identity is authenticated by the authentication module 110.

The session may be defined as having ended after a given number of specific actions have been applied, or when a predefined period has elapsed. For example: a session may be defined to span over a single reading of the status of an off-chip hardware module 150 by a functional user. After the reading is done—the session will be terminated, and authentication will be required in order to access the hardware module 150 again.

The system's state, including the condition of physical switches 162-F, 164-F, 166-F, 131-A, 131-B and access control hardware modules 164-H, following the session's end may be configured to remain unchanged, or configured to revert to that of a default user, which requires no authentication.

The definition of the ending of a user's session, as well as the system's state following the ending of a user's session is utilized to disallow hackers to 'piggyback' legitimate user sessions, and provides an additional security feature.

According to some embodiments of the present invention, the authorization module 130 a-priori stores the status of the access control manager 170, including that of the incorporated switches 162F, 164F, 166F and access control hardware modules 162-H, 164-H, 166-H in respect to the predefined different levels of authorization (e.g. Administrator users are granted complete access to all hardware modules within the secured system 100). The condition of said switches and hardware modules is set to their predefined status before any data is propagated to the user area 160, and cannot be altered during a user's session. This limitation prevents hackers from exploiting low-level authorization login (e.g. login of functional users) in order to perform high-level authorization actions (e.g. access memory regions that are reserved for administrators).

According to some embodiments at least one of the access-managed hardware module(s) (180) comprises at least one slave processor, configured to be controllable by the processor of an SEE (162-A, 164-A, 166-A). These embodiments enable the secured system to grant an authenticated user control over the slave processor via the SEE processor, according to the user's authorization level. This capability is especially beneficial when integrating the secured system 100 into legacy devices and systems: It enables the slave processor to perform its tasks within the hardware module, while enjoying the benefits of the secured system.

Figure 7:
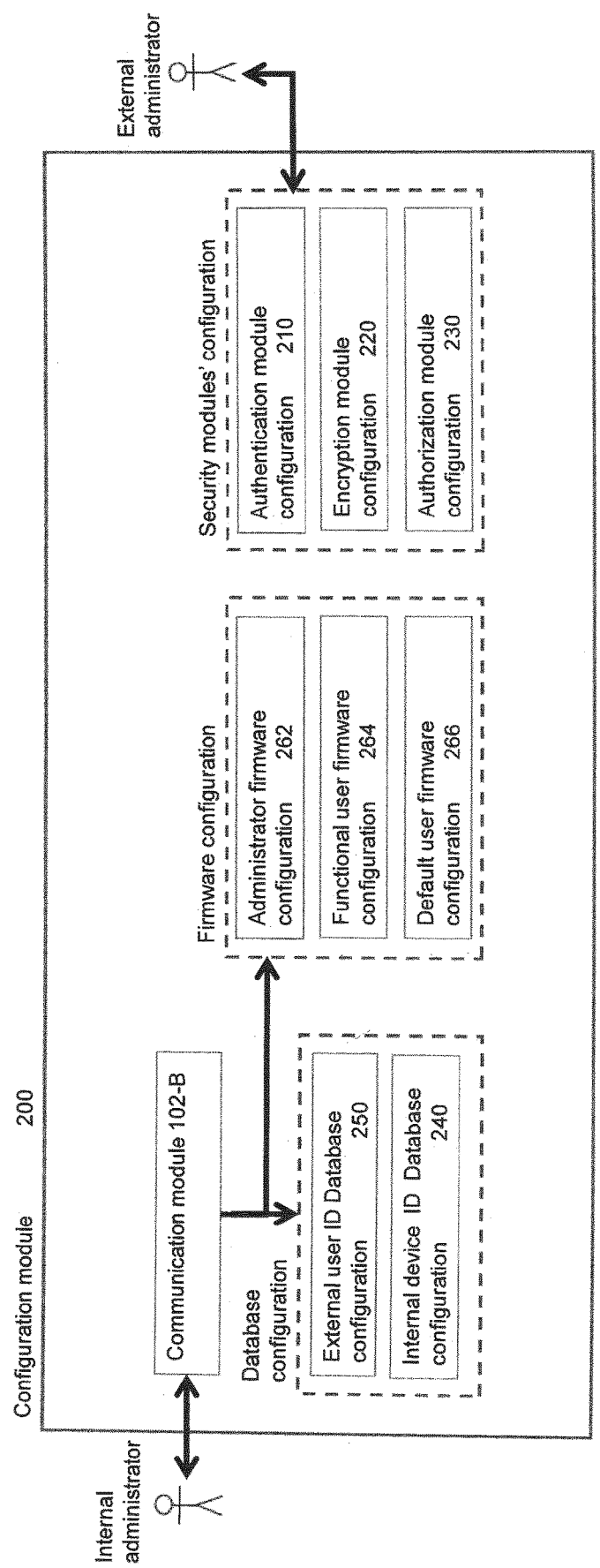
FIG. 7 presents a schematic block diagram depicting the configuration module 200, which facilitates the configuration of the secured system 100 by administrators, according to some embodiments of the present invention.

FIG. 7 presents a schematic block diagram depicting the configuration module 200, which facilitates the configuration of the secured system 100 by external administrators and internal administrators according to some embodiments of the present invention. The configuration module 200 may be implemented as any combination of software and hardware, and is not restricted to any software format or hardware architecture.

As explained above, the present description relates to two types of administrators: external and internal.

External administrators possess elevated access privileges for configuring the system prior to its deployment. This normally includes:
 coding and updating the secured system's firmware, and
 deterministic allocation of hardware resources as a function of predefined authorization levels.

The external administrator would normally be the secured system's manufacturer or vendor.

According to the embodiment presented in FIG. 7, external administrators are granted access via the respective, dedicated configuration modules, to update firmware pertaining to security modules (110, 120, 130):
 The authentication configuration module 210 will configure the respective secured system 100 authentication module 110. The encryption configuration module 220 will configure the respective secured system 100 encryption module 120. The authorization configuration module 230 will configure the respective secured system 100 authorization module 130.

Internal administrators are users who possess elevated access privileges for dynamically maintaining and configuring the system after it has been deployed. This typically includes:
 Setting the firmware of administrators' SEEs, functional users' SEEs, and default SEEs.
 Setting individual users' group membership;
 Setting specific users' levels of authorization; and
 Setting specific user groups' levels of authorization.

The internal administrator would typically be a system administrator within a plant or company where the secured system is deployed.

According to one embodiment presented in FIG. 7, the internal administrator employing the configuration module 200 may connect via the communication module 102-B (or communication module 102-A, not shown) to the secured system 100, and authenticate oneself as an administrator on that secured system 100. The said internal administrator will consequently be attributed complete access and configuration privileges, and be allocated an administrator SEE 162 on the secured system 100. Following such occupation of the administrator SEE 162, the internal administrator will be free to remotely configure the secured system 100 according to the contents of the modules resident within the configuration module 200:
 The external user ID database configuration module 250 will configure the respective secured system 100 external user ID database 150.
 The internal device ID database configuration module 240 will configure the respective secured system 100 internal device ID database 140.
 The administrator firmware configuration module 262 will configure the respective secured system 100 firmware of the administrator SEE 162.
 The functional user firmware configuration module 264 will configure the respective secured system 100 firmware of the functional user SEE 164.
 The default user firmware configuration module 266 will configure the respective secured system 100 firmware of the default user SEE 166.

By the method described above, the configuration module 200 facilitates simultaneous remote configuration of multiple secured systems 100. This capability is especially beneficial for the configuration of a plurality of systems (e.g. IOT or M2M apparatuses) that may be deployed in various, remote locations.

As explained above, according to some embodiments, the secured system 100 facilitates the creation of software-separated, protected execution environments within the SEEs (162, 164, 166), by means of hardware virtualization. This virtualization enables multiplication of hardware resources on each device D1, D2 and D3 (e.g. multiplication of communication protocol drivers). According to one embodiment of the present invention, functional users are restricted from accessing each-other's SEEs. According to some embodiments, different functional users' environments (164) may have predefined links between them, enabling them to collaborate over common hardware resources, and effectively utilize the said multiplication of resources.

Figure 8:
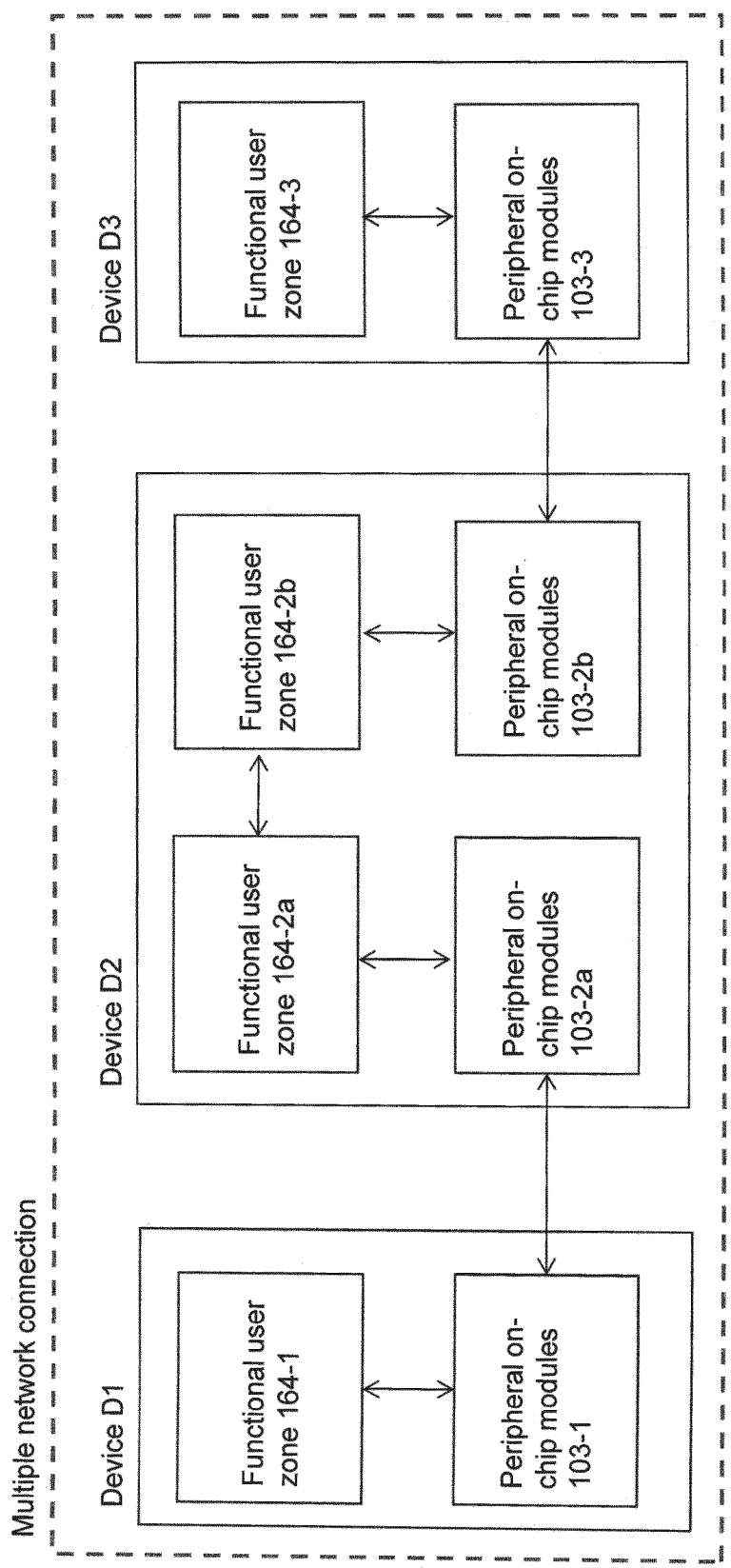
FIG. 8 presents a small network of three functional users, wherein one of the three serves as a bridge between the other two entities, according to one embodiment of the present invention.

FIG. 8 presents a schematic block diagram depicting an exemplary application, implemented by the present invention. The example depicted in FIG. 8 is of a multiple network constellation, comprised of a plurality of functional user devices (D1, D2 and D3). Each such device incorporates a secured system 100. Devices D1 and D3 operate respective functional user environments: 164-1 and 164-3. Device D2 facilitates two virtual active sessions, and operates two functional user SEEs, 164-2a and 164-2b.

According to the embodiment of FIG. 8, the SEEs of device D2 164-2a and 164-2b are configured to communicate amongst themselves, to control the utilization of common resources (such as peripheral on-chip communication modules) 103-2, effectively duplicating these resources among a plurality of software execution sessions.

Devices D1 and D3 make use of peripheral, on-chip communication modules, 103-1 and 103-3 respectively Device D2 effectively duplicates a peripheral on-chip communication module 103-2 to two separate modules: 103-2a and 103-2b. This duplication may be obtained by either one of two methods:
 Hardware virtualization, i.e.: when a processor on a single SEE (e.g. 164-2a) facilitates concurrent execution of a plurality of software sessions; or
 Hardware-separated independent SEEs (e.g. 164-2a and 164-2b): i.e. wherein SEE comprising an independent processor, and facilitating the execution of software. According to some embodiments, the Hardware-separated independent SEEs are configured to communicate among themselves to effectively duplicate hardware, and avoid issues relating to utilization of common hardware resources.

Communication modules 103-1, 103-2a, 103-2b and 103-3 are controlled by the respective functional user environments 164-1, 164-2a, 164-2b and 164-3, and serve as the basic building blocks for a network's infrastructure. These modules may, for example, be LAN, UART, I²C or any other communication protocol drivers.

The capability to impose restrictions on individual peripheral communication modules 103 by respective instances of secured systems 100, facilitates unique capabilities for controlling the communication networks implemented by the devices (D1, D2 and D3). For example:
 Specific devices in the network may be assigned to communicate only with other devices, thus forming sub-networks.
 Specific devices may be assigned to work by specific protocols, or by means of different communication hardware drivers (e.g. LAN vs USB).

Specific devices may be assigned a priority that is higher or lower than that of other devices, and thus facilitate a hierarchical communication network.

In FIG. 8, functional user environments 164-1 and 164-3 are members of separate sub-networks. The functional users' SEEs 164-2a, 164-2b of D2 implement a bridge between the two other functional users' SEEs: 164-1 of device 1 and 164-3 of D3.

According to some embodiments, the communication protocol between D1 and D2 is equivalent to that of the communication protocol between D2 and D3. In these embodiments, the constellation of FIG. 8 may depict multiple LAN networks, which co-exist on, and are bridged by a single device: D2.

According to some embodiments, the communication protocols between the devices may not be equivalent. In this case, the functional user environments 164-2a, 164-2b of device D2 may perform required control, interpretation, conversion or data sanitation functions. For example, D2 may:

Convert messages from the communication protocol of the first sub-network, driven by one type of driver modules 103-2a (e.g. I²C protocol) to the format of the second sub-network, driven by another type of driver modules 103-3 (e.g. the UART protocol);

Verify that transactions are virus and malware free; and

Apply network control, prioritization, and load balancing algorithms (e.g. in the physical, datalink, network or transport OSI network communication layers) for enhanced communication properties.

The following example emphasizes the benefits of deployment of secured systems 100 of the present invention, while maintaining at least two separate communication networks. Urban level SCADA (Supervisory Control and Data Acquisition) systems, such as traffic control centers and traffic police normally share a common traffic control network. The traffic lights are controlled via this network, and are therefore also part of it. However, traffic lights may also be required to connect to autonomous cars and public information services (e.g. public transport or navigation applications). For obvious security reasons it is imperative that the two connections will take place on a separate network. Therefore, the traffic lights will incorporate secured systems 100, that would interface the two, separate networks: Network 1 would host internal administrative users or functional users (e.g. for configuring the traffic light system through the administrators' SEE 162 or functional SEE 164, respectively) and Network 2 will host random autonomous vehicles, that may query the traffic light color through accessing the traffic light's default users' SEE 166 in the traffic light's secured system 100.

The system of the present invention may include, according to certain embodiments of the invention, machine readable memory containing or otherwise storing a program of instructions which, when executed by the machine, implements some or all of the apparatus, methods, features and functionalities of the invention shown and described herein. Alternatively or in addition, the apparatus of the present invention may include, according to certain embodiments of the invention, a program as above which may be written in any conventional programming language, and optionally a machine for executing the program such as but not limited to a general purpose computer which may optionally be configured or activated in accordance with the teachings of the present invention. Any of the teachings incorporated herein may wherever suitable operate on signals representative of physical objects or substances.

Unless specifically stated otherwise, as apparent from the following discussions, it is appreciated that throughout the specification discussions, utilizing terms such as, "processing", "computing", "estimating", "selecting", "ranking", "grading", "calculating", "determining", "generating", "reassessing", "classifying", "generating", "producing", "stereo-matching", "registering", "detecting", "associating", "superimposing", "obtaining" or the like, refer to the action and/or processes of a computer or computing system, or processor or similar electronic computing device, that manipulate and/or transform data represented as physical, such as electronic, quantities within the computing system's registers and/or memories, into other data similarly represented as physical quantities within the computing system's memories, registers or other such information storage, transmission or display devices. The term "computer" should be broadly construed to cover any kind of electronic device with data processing capabilities, including, by way of non-limiting example, personal computers, servers, computing system, communication devices, processors (e.g. Digital Signal Processor (DSP), Microcontrollers, Field Programmable Gate Array (FPGA), Application Specific Integrated Circuit (ASIC), etc.) and other electronic computing devices.

The present invention may be described, merely for clarity, in terms of terminology specific to particular programming languages, operating systems, browsers, system versions, individual products, and the like. It will be appreciated that this terminology is intended to convey general principles of operation clearly and briefly, by way of example, and is not intended to limit the scope of the invention to any particular programming language, operating system, browser, system version, or individual product.

It is appreciated that software components of the present invention including programs and data may, if desired, be implemented in ROM (Read Only Memory) form including CD-ROMs, EPROMs and EEPROMs, or may be stored in any other suitable typically non-transitory computer-readable medium such as but not limited to disks of various kinds, cards of various kinds and RAMs. Components described herein as software may, alternatively, be implemented wholly or partly in hardware, if desired, using conventional techniques. Conversely, components described herein as hardware may, alternatively, be implemented wholly or partly in software, if desired, using conventional techniques.

Included in the scope of the present invention, inter alia, are electromagnetic signals carrying computer-readable instructions for performing any or all of the steps of any of the methods shown and described herein, in any suitable order; machine-readable instructions for performing any or all of the steps of any of the methods shown and described herein, in any suitable order; program storage devices readable by machine, tangibly embodying a program of instructions executable by the machine to perform any or all of the steps of any of the methods shown and described herein, in any suitable order; a computer program product comprising a computer useable medium having computer readable program code, such as executable code, having embodied therein, and/or including computer readable program code for performing, any or all of the steps of any of the methods shown and described herein, in any suitable order; any technical effects brought about by any or all of the steps of any of the methods shown and described herein, when performed in any suitable order; any suitable apparatus or device or combination of such, programmed to perform, alone or in combination, any or all of the steps of any of the methods shown and described herein, in any suitable order; electronic devices each including a processor and a cooperating input device and/or output device and operative to perform in software any steps shown and described herein; information storage devices or physical records, such as disks or hard drives, causing a computer or other device to be configured so as to carry out any or all of the steps of any of the methods shown and described herein, in any suitable order; a program pre-stored e.g. in memory or on an information network such as the Internet, before or after being downloaded, which embodies any or all of the steps of any of the methods shown and described herein, in any suitable order, and the method of uploading or downloading such, and a system including server/s and/or client/s for using such; and hardware which performs any or all of the steps of any of the methods shown and described herein, in any suitable order, either alone or in conjunction with software. Any computer-readable or machine-readable media described herein is intended to include non-transitory computer- or machine-readable media.

Any computations or other forms of analysis described herein may be performed by a suitable computerized method. Any step described herein may be computer-implemented. The invention shown and described herein may include (a) using a computerized method to identify a solution to any of the problems or for any of the objectives described herein, the solution optionally include at least one of a decision, an action, a product, a service or any other information described herein that impacts, in a positive manner, a problem or objectives described herein; and (b) outputting the solution.

The scope of the present invention is not limited to structures and functions specifically described herein and is also intended to include devices which have the capacity to yield a structure, or perform a function, described herein, such that even though users of the device may not use the capacity, they are, if they so desire, able to modify the device to obtain the structure or function.

Features of the present invention which are described in the context of separate embodiments may also be provided in combination in a single embodiment.

For example, a system embodiment is intended to include a corresponding process embodiment. Also, each system embodiment is intended to include a server-centered "view" or client centered "view", or "view" from any other node of the system, of the entire functionality of the system, computer-readable medium, apparatus, including only those functionalities performed at that server or client or node.

The invention claimed is:

1. A system for authenticating a user's identity and facilitating execution of embedded software and access to specific hardware modules by said user according to an authorization level, system comprising:
   a communication interface, configured to enable a user to interface the system;
   an authentication engine, configured to authenticate said user's identity;
   an authorization engine, configured to be associated with a first processor and a computer readable storage device on which are stored modules of firmware code executable by said first processor, whereupon execution of said firmware code by said first processor determines an authorization level and access privilege associated with said user, according to a user authorization policy;
   at least one Software Execution Environment (SEE), comprising at least a second processor and a readable storage device, on which are stored modules of firmware instruction code executable by said user on said second processor; and
   at least one hardware switch, controllable by said authorization engine and configured to physically enable or disable data transfer over a data path between the user and the SEE,
   whereupon successful authentication of said user by the authentication engine causes the authorization engine to allocate hardware resources at the SEE for the said authenticated user, and to configure the at least one hardware switch to enable transfer of data between the user and the SEE, so as to enable the user to execute embedded code on the at least one second processor according to the user's authorization level.

2. The system of claim 1, wherein said authorization engine is associated with a database on which are stored parameters of user authorization policy that are deterministically set prior to the deployment of the system, and may not be changed after deployment, including:
   at least one authorization level(s);
   access privileges assigned to each authorization level; and
   identity of at least one access-managed hardware module(s).

3. The system of claim 1, wherein said authorization engine is configured to be associated with a database on which are stored parameters of user authorization policy that are configurable by an administrator after the deployment of the system, including:
   identity of specific users and/or groups of users; and
   authorization levels attributed to each user and/or user groups.

4. The system of claim 1, wherein said SEE is associated with an access control manager, configured to enforce the user's access privileges to hardware modules, said access control manager comprising:
   a switch controller, configurable by the said authorization engine according to the user's authorization level;
   at least one hardware switch, controllable by said switch controller,
   wherein said at least one hardware switch is configured to physically enable or disable the user's access via the SEE's processor to specific on-chip or off-chip hardware modules, according to the switch controller's configuration by the authorization engine.

5. The system of claim 4, wherein said at least one hardware switch is configured to enforce the user's access privileges to specific hardware modules by physically enabling or disabling a hardware data path between the communication interface and a specific access-managed hardware module, according to the switch controller's configuration by the authorization engine.

6. The system of claim 5, wherein said access control manager is associated with access control hardware modules, configured to refine hard-decisions of users' access restriction to hardware modules imposed by said hardware switches.

7. The system of claim 6, comprising at least two SEEs, wherein each SEE is deterministically configured to enable separate execution of predefined firmware on each SEE processor, and/or access hardware modules according to said authenticated user's authorization level, so as to facilitate different functionality of said SEEs and/or hardware modules.

8. The system of claim 7, wherein the switch controller is configured by the authorization engine to control specific hardware switches so as to enable or disable specific signals of specific hardware modules, including a Clock (CLK) signal and/or a supply voltage (VCC) signal, according to the user's authorization level.

9. The system of claim 7, comprising a plurality of hardware-separated, independent Software Execution Environments (SEEs), each enabling independent execution of software on the SEEs' processors, and access to hardware modules by either the same or a different authenticated user, according to said user'(s) level of authorization.

10. The system of claim 9, wherein said plurality of hardware-separated, independent SEEs are deterministically configured to enable execution of predefined firmware and access predefined hardware modules according to predefined user authorization levels, and wherein authenticated users are routed by at least one hardware switch to a SEE that matches their authorization levels at a beginning of a session, and wherein said users are not able to access another SEE for the duration of their session.

11. The system of claim 10, wherein at least one of said plurality of independent SEEs is a default users' SEE, configured to require no user authentication, and provide predefined default authorization levels for executing software and predefined default access privileges for accessing hardware modules.

12. The system of claim 10, wherein at least one of said plurality of independent SEEs is a functional users' SEE, configured to require user authentication for access, and provide preconfigured authorization levels for executing embedded software and accessing hardware modules.

13. The system of claim 10, wherein at least one of said plurality of independent SEEs is an administrators' SEE, configured to require administrative authentication for access, and provide authorization levels for configuring elements of the system, executing embedded software and accessing hardware modules.

14. The system of claim 9 wherein at least two of said plurality of independent SEE are configured to communicate amongst themselves, to control the utilization of common hardware resources, thus effectively duplicating the utilization of said resources among said plurality of software execution environments.

15. The system of claim 6, wherein at least one of said access-managed hardware module(s) comprises at least one third processor, and wherein said third processor is configured to be controllable by the processor of an SEE, thus enabling the system to grant an authenticated user control over said third processor, via said SEE processor, according to said user's authorization level.

16. The system of claim 5, wherein said SEE(s) further comprise an interrupt controller, and wherein the authorization engine is configured to detect a user's attempt to access a restricted memory address or access a protected hardware module, and the interrupt controller is configured to trigger an asynchronous interrupt to the processor in response to said detected attempt by the authorization engine.

17. The system of claim 4, wherein the switch controller is configurable by the authorization engine via the SEE's processor.

18. The system of claim 1, further comprising an encryption module, configured to implement any cryptographic function required to maintain the security of data transaction between the communication interface and SEEs, wherein said encryption module is connected via said hardware switch to the authorization engine, and wherein the encryption module is connected via at least one other hardware switch to at least one SEE(s), and wherein said hardware switches are controllable by said authorization engine to connect or detach the communication interface to said SEE(s) according to said user's authorization levels.

19. A method for authenticating a user's identity and facilitating execution of embedded software and access to specific hardware modules by said user according to an authorization level, said method comprising:
enabling a user to interface the system via a communication interface;
authenticating said user's identity by an authentication engine;
determining authorization level and access privilege associated with said user, according to a user authorization policy, by an authorization engine;
allocating hardware resources at a Software Execution Environment (SEE) for the said authenticated user;
configuring at least one hardware switch, to enable transfer of data between the user and the SEE, so as to enable the user to execute embedded code on a processor incorporated within said SEE, according to the user's authorization level;
implementing any cryptographic function required to maintain the security of data transaction between the communication interface and SEEs by an encryption module;
connecting said encryption module via a hardware switch to the authorization engine;
connecting said encryption module via at least one other hardware switch to at least one SEE(s); and
controlling said hardware switches by said authorization engine to connect or detach the communication interface to said SEE(s) according to said user's authorization levels.

20. The method of claim 19, wherein the user's access privileges to hardware modules are enforced by applying the steps of:
configuring a switch controller according to the user's authorization level; and
controlling at least one hardware switch, by said switch controller, so as to enable or restrict the user's access via the SEE's processor to specific on-chip or off-chip hardware modules, according to the switch controller's configuration;
the method further comprising configuring said hardware switch(es) to enforce the user's access privileges to specific hardware modules by physically enabling or disabling a hardware data path between the communication interface and a specific access-managed hardware module, according to the switch controller's configuration; and
the method further comprising configuring access control hardware modules to refine hard-decisions of users' access restriction to hardware modules imposed by said hardware switches.

21. The method of claim 20, further comprising the step of deterministically configuring at least two SEEs, to enable separate execution of predefined firmware on each SEE, and/or access hardware modules according to said authenticated user's authorization level, so as to facilitate different functionality of said SEEs and/or hardware modules.

22. The method of claim 21, further comprising the step of configuring the switch controller is to control specific hardware switches so as to enable or disable specific signals of specific hardware modules, including a Clock (CLK) signal and/or a supply voltage (VCC) signal, according to the user's authorization level.

23. The method of claim 19, wherein the user's access privileges to hardware modules are enforced by applying the steps of:

- configuring a switch controller according to the user's authorization level; and
- controlling at least one hardware switch, by said switch controller, so as to enable or restrict the user's access via the SEE's processor to specific on-chip or off-chip hardware modules, according to the switch controller's configuration;
- the method further comprising configuring said hardware switch(es) to enforce the user's access privileges to specific hardware modules by physically enabling or disabling a hardware data path between the communication interface and a specific access-managed hardware module, according to the switch controller's configuration; and
- the method further comprising:
  - configuring the authorization module to detect a user's attempt to access a restricted memory address or access a protected hardware module; and
  - configuring an interrupt controller to trigger an asynchronous interrupt to a processor of the SEE in response to said detected attempt by the authorization module.

* * * * *